UNITED STATES PATENT OFFICE.

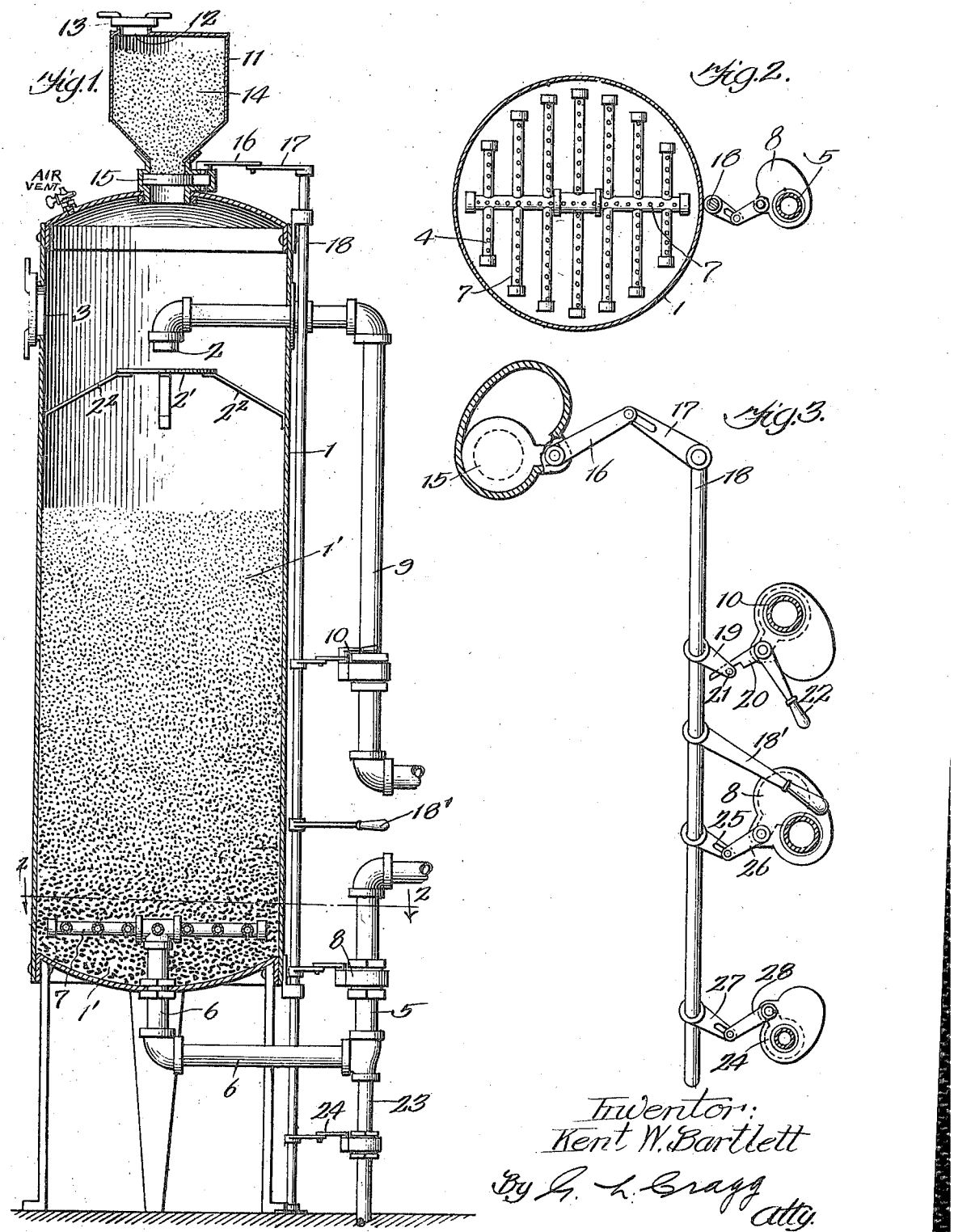

KENT W. BARTLETT, OF HAMMOND, INDIANA.

LIQUID-TREATING APPARATUS.

1,233,016. Specification of Letters Patent. Patented July 10, 1917.

Application filed November 6, 1916. Serial No. 129,694.

*To all whom it may concern:*

Be it known that I, KENT W. BARTLETT, citizen of the United States, residing at Hammond, in the county of Lake and State of Indiana, have invented a certain new and useful Improvement in Liquid-Treating Apparatus, of which the following is a full, clear, concise, and exact description, reference being had to the accompanying drawings, forming a part of this specification.

My invention relates to liquid treating apparatus and is of particular service in the softening of hard water, though the invention is not to be limited to any use to which it may be put. My invention is useful in connection with that class of apparatus in which liquid treating chemical is permanently disposed within liquid treating tanks and which liquid treating chemical is of such a nature that it may be regenerated by regenerating chemical passed into the tank from time to time, there being means for removing the products of regeneration from the tank.

My invention resides in the provision of valves for controlling the functioning of the apparatus and operating mechanism for the valves or various combinations of the valves whereby such valves may be operated in proper relation. By means of the valving mechanism and valve operating mechanism included in the preferred embodiment of my invention the regenerating chemical and the liquid to be intermixed with the regenerating chemical to dilute the same are bound to be admitted to the tank together although the flow of the liquid to the tank may be permitted or prevented when the flow of regenerating chemical is cut off. I am also enabled to prevent the flow of liquid through the course to be followed by treated liquid when the regenerating chemical is being admitted to the tank. The preferred construction of my invention also enables me to establish the flow of waste liquid from the tank during the period of regeneration.

I will explain my invention more fully by reference to the accompanying drawing showing the preferred embodiment thereof and in which Figure 1 is a view in elevation, partially in section, of the preferred form of apparatus; Fig. 2 is a view on line 2—2 of Fig. 1; and Fig. 3 is a diagrammatic illustration of the valve mechanism and the lever mechanism for operating it.

Like parts are indicated by similar characters of reference throughout the different figures.

The treating tank 1 has an inlet 2 for the liquid, such as hard water, to be treated and an inlet 3 for the chemical with which the liquid is to be treated. This chemical is desirably in the form of zeolite (sodium or potassium hydrated aluminum silicate). This chemical is shown at $1^1$ in the tank 1 preferably up to the level indicated in Fig. 1. The liquid is discharged upon the baffle plate $2^1$ that is supported by the spider $2^2$ whereby the liquid is thoroughly spread to find passage through all portions of the chemical and does not tend to form and follow definite channels through the chemical. The liquid finds exit from the tank through a plurality of openings 4 that are distributed over the bottom of the tank and in seeking which the liquid finds access to all parts of the chemical. Liquid after its passage through the tank, is discharged through an eduction pipe 5 which is brought in communication with the tank by the coupling piping 6, the upper end of this piping 6 projecting above the bottom of the tank and having a plurality of branches 7 distributed over the bottom of the tank and in which branches the eduction openings 4 are provided. The liquid being treated flows continuously through the tank and, in its treated form continuously flows through the outlet pipe 5, the quick acting treated liquid gate valve 8 being normally open. The liquid to be treated is led into the tank through the piping 9, the raw liquid quick acting gate valve 10 being normally open during the liquid treating operation. When zeolites are employed as the liquid treating chemical, regeneration thereof is required at intervals and I therefore provide means for admitting regenerating chemical to the tank at a place which is preferably distinct from the liquid treating chemical inlet opening 3 and the liquid inlet opening 2 and which is indicated in the drawing as being at the upper end of the tank. I particularly prefer a location for the entry of the regenerating chemical that is distinct from the entry 2 for the liquid when the regenerating chemical is in solid form, but I do not wish to be limited to the arrangement set forth. Where regenerating chemical of solid form is employed I desirably dispose the same in a container 11 through a manhole 12 which is hermetically sealed by the manhole cover 13. The solid regenerating chemical 14 (such as sodium or potassium chlorid, or both) indicated in the container 11 is normally prevented from passing into the tank 1 by means of a quick acting regenerating chemical gate valve 15 which normally closes the neck of the container, the lower part of the container being desirably in the shape of a hopper. When the valve 15 is open the valve 10 should be open, whereby the incoming regenerating chemical may be intermixed with or dissolved in the water flowing through the pipe 9. When the valve 15 is closed the valve 10 may be either open or closed as desired for the purpose of admitting raw liquid to the tank or for discontinuing the admission thereof to the tank. The mechanism for operating the valves 15 and 10 is such that when the valve 15 is closed the valve 10 may be either open or closed and when the valve 15 is open the valve 10 must be open. This mechanism for controlling the inter-relation of the valves 10 and 15 desirably includes an arm 16 in fixed relation to the valve 15, a crank 17 in pin and slot connection with the outer end of the arm 16 and in rigid relation to the crank rod 18 that has an operating handle 18¹ fixed thereto. The crank rod 18 also carries a crank 19 which is adapted for engagement with an arm 20 in fixed relation to the valve 10, the crank 19 carrying a pin 21 which may engage the arm 20 when the crank rod 18 is moved in a counter-clockwise direction to shift the valve 10 from a closed position to an open position, when the valve 15 is shifted from a closed position to an open position, and assuming that the valve 10 was in a closed position. When the valve 15 is moved from an open position to a closed position the valve 10 remains in the open position in which it was placed but in order that it may be closed at will while the valve 15 is closed the valve 10 has fixed thereto a crank handle 22. When the valve 15 is open and the valve 10 is consequently open the water or other liquid and the regenerating chemical are inwardly flowing into the tank 1 at the same time. The flow of the regenerating chemical into the tank obviously may cease while the flow of the liquid continues, it being possible to keep the valve 15 open as the liquid will not be discharged through the upper end of the tank owing to the sealing of the opening 12 by the closure 13. During the process of regenerating the liquid treating chemical the liquid, generally speaking, does not undergo effective treatment and, in such event, it should not be allowed to pass through the piping 5 that is provided solely for the passage of treated liquid. The valve 8 is therefore closed to prevent the passage of liquid from the tank 1 through the pipe 5 at a time when the liquid treating chemical is being regenerated. It may be desired to effect the discharge of the liquid from the tank during the regeneration of the liquid treating chemical and in such event I employ an outlet pipe 23, connected with the piping 6, normally closed by a quick acting waste valve 24. In order that the closure of the valve 8 and the opening of the valve 24 may be assured when the liquid treating chemical is being regenerated and waste liquid is being passed from the tank, I provide upon the crank rod 18 a crank 25 in pin and slot connection with an arm 26 that is rigid with respect to the valve 8 and a crank 27 in pin and slot connection with an arm 28 that is rigid with respect to the valve 24.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A liquid treating apparatus including a tank; a valve for permitting and preventing passage of chemical to said tank; a second valve for permitting and preventing passage of liquid to said tank; and operating mechanism for said valves and having parts serving to open the second valve when the first valve is opened and permitting the second valve to be opened or closed when the first valve is closed.

2. Liquid treating apparatus including a tank; a valve for permitting and preventing passage of chemical to said tank; a second valve for permitting and preventing passage of liquid to said tank; a third valve for permitting and preventing flow of waste liquid from the tank; and operating mechanism for said valves and having parts serving to open the second and third valves when the first valve is opened and permitting the second valve to be opened or closed when the first valve is closed.

3. Liquid treating apparatus including a tank; a valve for permitting and preventing passage of chemical to said tank; a second valve for permitting and preventing passage of liquid to said tank; a third valve for permitting and preventing flow of waste liquid from the tank; and operating mechanism for said valves and having parts serving to open the second and third valves when the first valve is opened and to close the third valve when the first valve is closed and permitting the second valve to be opened or closed when the first valve is closed.

4. Liquid treating apparatus including a tank; a valve for permitting and preventing passage of chemical to said tank; a second valve for permitting and preventing passage of liquid to said tank; a third valve for permitting and preventing flow of treated liquid from the tank; and operating mechanism for said valves and having parts serving to open the second valve and close the third valve when the first valve is opened and permitting the second valve to be opened or closed when the first valve is closed.

5. Liquid treating apparatus including a tank; a valve for permitting and preventing passage of chemical to said tank; a second valve for permitting and preventing passage of liquid to said tank; a third valve for permitting and preventing flow of treated liquid from the tank; and operating mechanism for said valves and having parts serving to open the second valve and close the third valve when the first valve is opened and permitting the second valve to be opened or closed when the first valve is closed and to open the third valve when the first valve is closed.

In witness whereof, I hereunto subscribe my name this 1st day of November, A. D. 1916.

KENT W. BARTLETT.

Witnesses:
G. L. CRAGG,
ETTA L. WHITE.